(12) United States Patent
Soucy et al.

(10) Patent No.: US 9,193,111 B2
(45) Date of Patent: Nov. 24, 2015

(54) SUPER POLISH MASKING OF INTEGRALLY BLADED ROTOR

(75) Inventors: Ronald R. Soucy, Tolland, CT (US); Michael Dunay, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 762 days.

(21) Appl. No.: 13/539,950

(22) Filed: Jul. 2, 2012

(65) Prior Publication Data

US 2014/0003951 A1    Jan. 2, 2014

(51) Int. Cl.
*B24C 1/04* (2006.01)
*B29C 67/00* (2006.01)
*B24B 31/06* (2006.01)
*B24B 31/12* (2006.01)
*F01D 5/34* (2006.01)
*B29C 59/02* (2006.01)

(52) U.S. Cl.
CPC ............. *B29C 67/0077* (2013.01); *B24B 31/06* (2013.01); *B24B 31/12* (2013.01); *F01D 5/34* (2013.01); *B29C 2059/027* (2013.01); *F05D 2230/53* (2013.01)

(58) Field of Classification Search
CPC ............ B24C 1/04; B24B 1/00; B24B 31/00; B24B 37/04
USPC .............................. 451/28, 29, 30–31, 38–40
See application file for complete search history.

(56) References Cited

U.S. PATENT DOCUMENTS

| | | | | |
|---|---|---|---|---|
| 3,507,740 A | * | 4/1970 | Gaspari ........................ | 428/42.2 |
| 3,683,564 A | * | 8/1972 | Lawrence ..................... | 451/421 |
| 4,512,115 A | * | 4/1985 | Miller .............................. | 451/49 |
| 4,530,861 A | * | 7/1985 | Sippel et al. .................. | 427/444 |
| 4,816,284 A | * | 3/1989 | Magee ............................ | 427/11 |
| 5,006,207 A | * | 4/1991 | Peterman et al. ............. | 205/120 |
| 5,052,155 A | * | 10/1991 | Blacka et al. .................. | 451/78 |
| 5,665,217 A | * | 9/1997 | Gruver et al. ................. | 205/110 |
| 5,702,574 A | * | 12/1997 | Foster et al. ............. | 204/224 R |
| 5,824,260 A | | 10/1998 | Sauerhoefer | |
| 5,989,679 A | | 11/1999 | Sauerhoefer | |
| 5,998,755 A | * | 12/1999 | Zajchowski et al. ....... | 219/76.16 |
| 6,053,696 A | * | 4/2000 | Roberts ............................ | 415/9 |
| 6,627,833 B2 | | 9/2003 | Varsell et al. | |
| 6,764,384 B1 | * | 7/2004 | Kleer et al. ..................... | 451/32 |
| 7,413,001 B2 | | 8/2008 | Wang et al. | |

(Continued)

FOREIGN PATENT DOCUMENTS

EP    2289666 A2    3/2011
FR    2676970 A1 * 12/1992    ................ B44C 1/22

(Continued)

OTHER PUBLICATIONS

International Preliminary Report on Patentability for International Application No. PCT/US2013/047538 mailed on Jan. 15, 2015.

(Continued)

*Primary Examiner* — George Nguyen
(74) *Attorney, Agent, or Firm* — Carlson, Gaskey & Olds, P.C.

(57) ABSTRACT

A method of polishing an integrally bladed rotor includes the steps of positioning a mask on an integrally bladed rotor such that a portion of the integrally bladed rotor is unmasked to define an exposed portion and polishing the exposed portion of the integrally bladed rotor.

27 Claims, 8 Drawing Sheets

(56) References Cited

U.S. PATENT DOCUMENTS

| | | |
|---|---|---|
| 7,572,524 B2 | 8/2009 | Sabol et al. |
| 7,967,659 B2 * | 6/2011 | Erickson et al. ............... 451/5 |
| 8,105,133 B2 * | 1/2012 | Jayabalan .................. 451/442 |
| 2003/0114093 A1 | 6/2003 | Wrue |
| 2003/0176918 A1 | 9/2003 | Schneider |
| 2004/0002293 A1 | 1/2004 | Green |
| 2005/0287386 A1 | 12/2005 | Sabol et al. |
| 2006/0021579 A1* | 2/2006 | Bernaski et al. ............. 118/720 |
| 2006/0035566 A1* | 2/2006 | Grady et al. ................. 451/28 |
| 2006/0119012 A1* | 6/2006 | Ruatta et al. ................. 264/497 |
| 2007/0259606 A1* | 11/2007 | Williams et al. ............. 451/31 |
| 2007/0277954 A1 | 12/2007 | Kamel et al. |
| 2009/0235526 A1 | 9/2009 | Secherling et al. |
| 2010/0159808 A1* | 6/2010 | Shimodaira et al. ......... 451/36 |
| 2010/0287772 A1 | 11/2010 | Hennig et al. |
| 2011/0047777 A1 | 3/2011 | Soucy et al. |
| 2012/0003086 A1 | 1/2012 | Morris et al. |
| 2012/0266426 A1* | 10/2012 | Feldmann et al. ........... 29/90.01 |
| 2013/0294919 A1* | 11/2013 | Elfizy et al. ............... 416/223 R |
| 2013/0323071 A1* | 12/2013 | Boon Beng et al. .......... 416/234 |
| 2014/0093384 A1* | 4/2014 | Mironets et al. .......... 416/241 R |

FOREIGN PATENT DOCUMENTS

| | | | |
|---|---|---|---|
| GB | 717365 | * 10/1954 | .............. B24C 27/18 |
| JP | 2007253247 A | 10/2007 | |

OTHER PUBLICATIONS

International Search Report and Written Opinion for International Application No. PCT/US2013/047538 completed on Sep. 2, 2013.

Search Report and Written Opinion for Singapore Application No. 11201408559S dated Jul. 20, 2015.

* cited by examiner

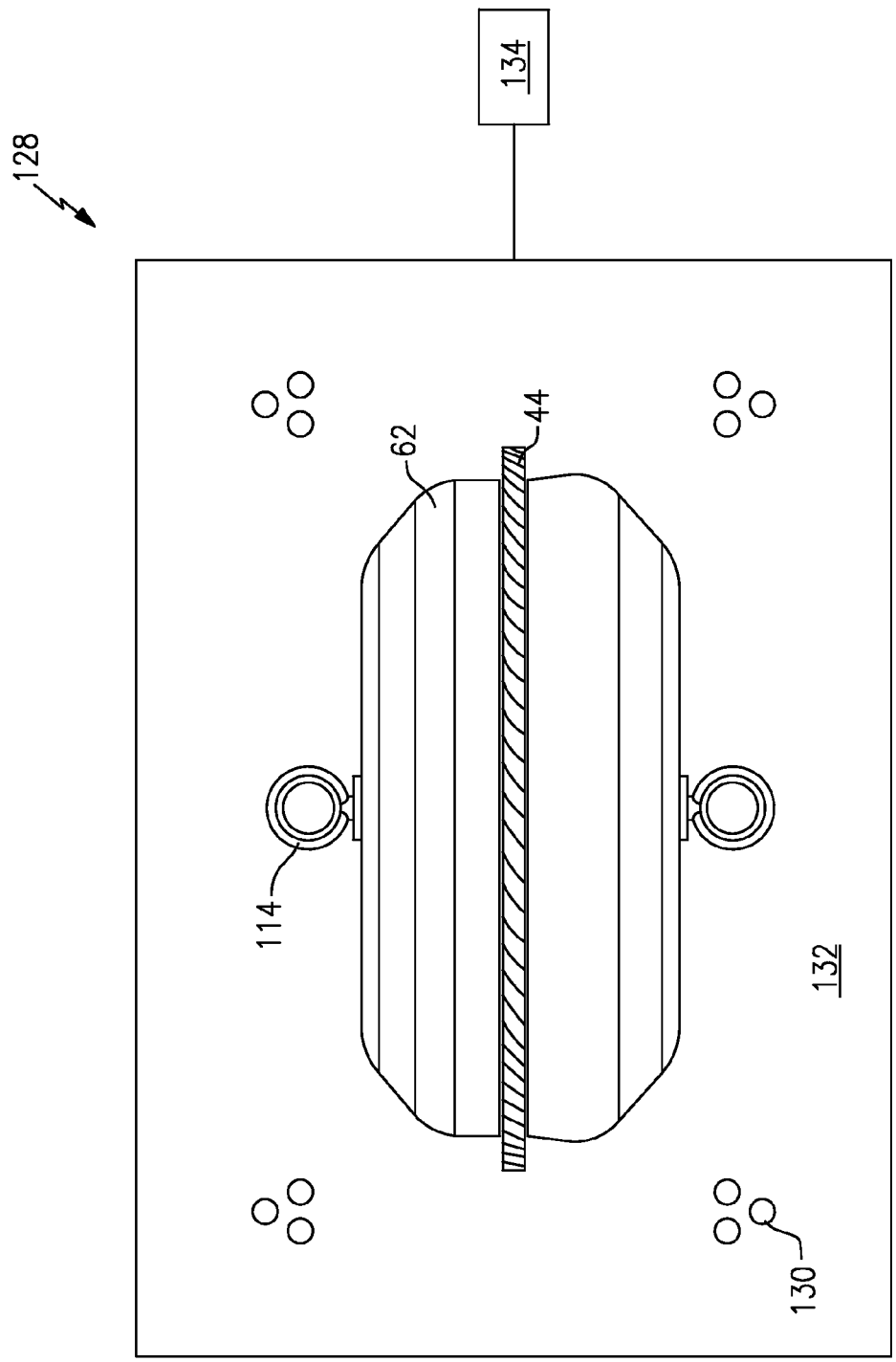

SUPER POLISH MASKING OF INTEGRALLY BLADED ROTOR

BACKGROUND OF THE INVENTION

Gas turbine engines can include an integrally bladed rotor that is utilized in fan and compressor applications. The integrally bladed rotor includes a rotor hub and circumferentially spaced blades extending outwardly from and joined metallurgically to a periphery of the rotor hub.

An integrally bladed rotor can be subject to an abrasive polishing process to improve the efficiency of the integrally bladed rotor. Portions of the integrally bladed rotor can be masked to prevent abrasive media from contacting specific areas of the integrally bladed rotor.

SUMMARY OF THE INVENTION

A method of polishing an integrally bladed rotor includes the steps of positioning a mask on an integrally bladed rotor such that a portion of the integrally bladed rotor is unmasked to define an exposed portion and polishing the exposed portion of the integrally bladed rotor.

In a further non-limited embodiment of any of the foregoing method embodiments, the method may include the step of creating a mask employing selective laser sintering.

In a further non-limited embodiment of any of the foregoing method embodiments, the method may include the step of creating a mask by directing a laser towards a powder of particulates based on a three dimensional computer model programmed into a computer to fuse the powder of particulates together.

In a further non-limited embodiment of any of the foregoing method embodiments, the method may include powder of particulates that are glass reinforced nylon powder.

In a further non-limited embodiment of any of the foregoing method embodiments, the method may include a laser that is a carbon dioxide laser.

In a further non-limited embodiment of any of the foregoing method embodiments, the method may include a laser that is pulsed.

In a further non-limited embodiment of any of the foregoing method embodiments, the method may include the steps of directing a laser to fuse powder of particulates with the laser to form a layer having a thickness, fusing the powder of particulates with the laser to form another layer having the thickness, and fusing the layer and the another layer with the laser.

In a further non-limited embodiment of any of the foregoing method embodiments, the method may include a layer having a thickness of about 0.004 inch.

In a further non-limited embodiment of any of the foregoing method embodiments, the method may include an exposed portion of an integrally blade rotor having an outer circumferential surface of a rotor hub and a plurality of blades that extend from the outer circumferential surface of the rotor hub.

In a further non-limited embodiment of any of the foregoing method embodiments, the method may include a step of polishing an exposed portion of an integrally bladed rotor by positioning a mask and the integrally bladed rotor in a slurry including an abrasive media.

In a further non-limited embodiment of any of the foregoing method embodiments, the method may include the step of agitating a slurry to move an abrasive media towards an exposed portion of an integrally bladed rotor to polish the exposed portion of the integrally bladed rotor.

A mask for covering and masking areas of an integrally bladed rotor includes a first portion located on a first side of an integrally bladed rotor including a first projection that is received in a first side of an opening of the integrally bladed rotor, a second portion located on a second side of the integrally bladed rotor, and a third portion including a second projection that is received in a second side of the opening in the integrally bladed rotor.

In a further non-limited embodiment of any of the foregoing mask embodiments, the mask may include a first portion, a second portion, and a third portion formed by selective laser sintering In a further non-limited embodiment of any of the foregoing mask embodiments, the mask may be made of glass reinforced nylon.

In a further non-limited embodiment of any of the foregoing mask embodiments, the mask may include a first portion including a circumferential surface, a radial surface, and a surface located therebetween.

In a further non-limited embodiment of any of the foregoing mask embodiments, the mask may include a circumferential surface that is a substantially flat circumferential surface and a radial surface that is a substantially flat radial surface.

In a further non-limited embodiment of any of the foregoing mask embodiments, the mask may include a surface angled about 45° relative to the circumferential surface and the radial surface.

In a further non-limited embodiment of any of the foregoing mask embodiments, the mask may include a first portion that is substantially hollow.

In a further non-limited embodiment of any of the foregoing mask embodiments, the mask may include a second portion including a circumferential surface, a radial surface, and a surface located therebetween.

In a further non-limited embodiment of any of the foregoing mask embodiments, the mask may include a circumferential surface that is a substantially flat circumferential surface and a radial surface that is a substantially flat radial surface.

In a further non-limited embodiment of any of the foregoing mask embodiments, the mask may include a surface angled about 45° relative to a circumferential surface and a radial surface.

In a further non-limited embodiment of any of the foregoing mask embodiments, the mask may include a second portion that is substantially hollow.

In a further non-limited embodiment of any of the foregoing mask embodiments, the mask may include a second portion including two identical portions that are positioned on an integrally bladed rotor to define the second portion of the mask.

These and other features of the present invention can be best understood from the following specification and drawings, the following of which is a brief description.

BRIEF DESCRIPTION OF THE DRAWINGS

FIG. 8 illustrates the mask and integrally bladed rotor in a vat during the abrasive polishing process.

DETAILED DESCRIPTION OF THE PREFERRED EMBODIMENTS

Figure 1:
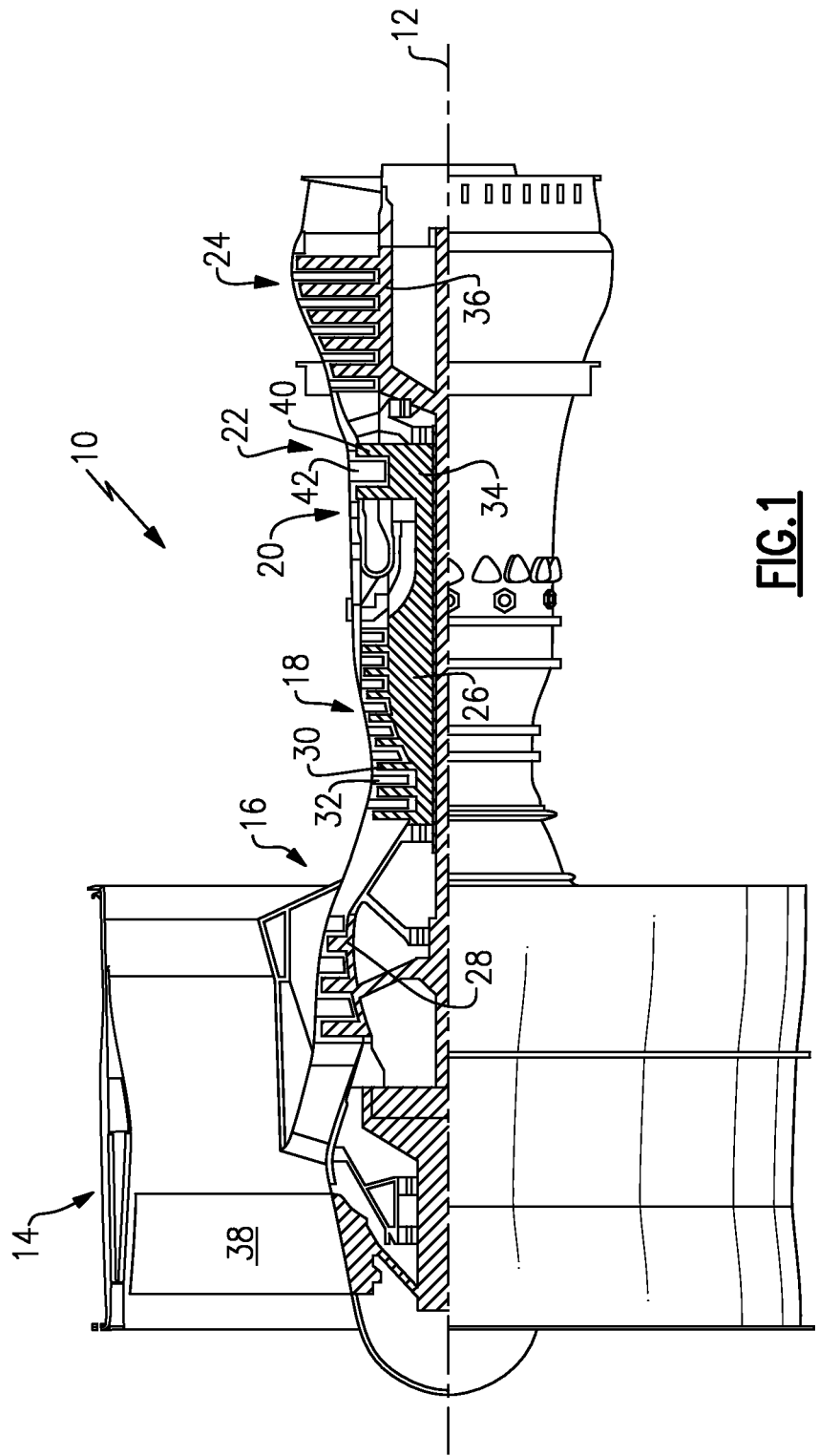
FIG. 1 illustrates a simplified cross-sectional view of a standard gas turbine engine.

FIG. 1 illustrates a gas turbine engine 10 that is circumferentially disposed about an axis 12. The gas turbine engine 10 includes a fan section 14, a low-pressure compressor section 16, a high-pressure compressor section 18, a combustion section 20, a high-pressure turbine section 22, and a low-pressure turbine section 24.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The high-pressure compressor section 18 and the low-pressure compressor section 16 include rotors 26 and 28, respectively. The rotors 26 and 28 are configured to rotate about the axis 12, driving the compressors 16 and 18. The compressors 16 and 18 include alternating rows of rotating compressor blades 30 and static airfoils or vanes 32.

The high-pressure turbine section 22 includes a rotor 34 that is rotatably coupled to the rotor 26, and the low-pressure turbine section 24 includes a rotor 36 that is rotatably coupled to the rotor 28. The rotors 34 and 36 are configured to rotate about the axis 12 in response to expansion. When rotated, the rotors 34 and 36 drive the high-pressure compressor section 18 and the low-pressure compressor section 16. The rotor 36 also rotatably drives a fan 38 of the fan section 14. The turbines 22 and 24 include alternating rows of rotating airfoils or turbine blades 20 and static airfoils or vanes 42.

Figure 2:
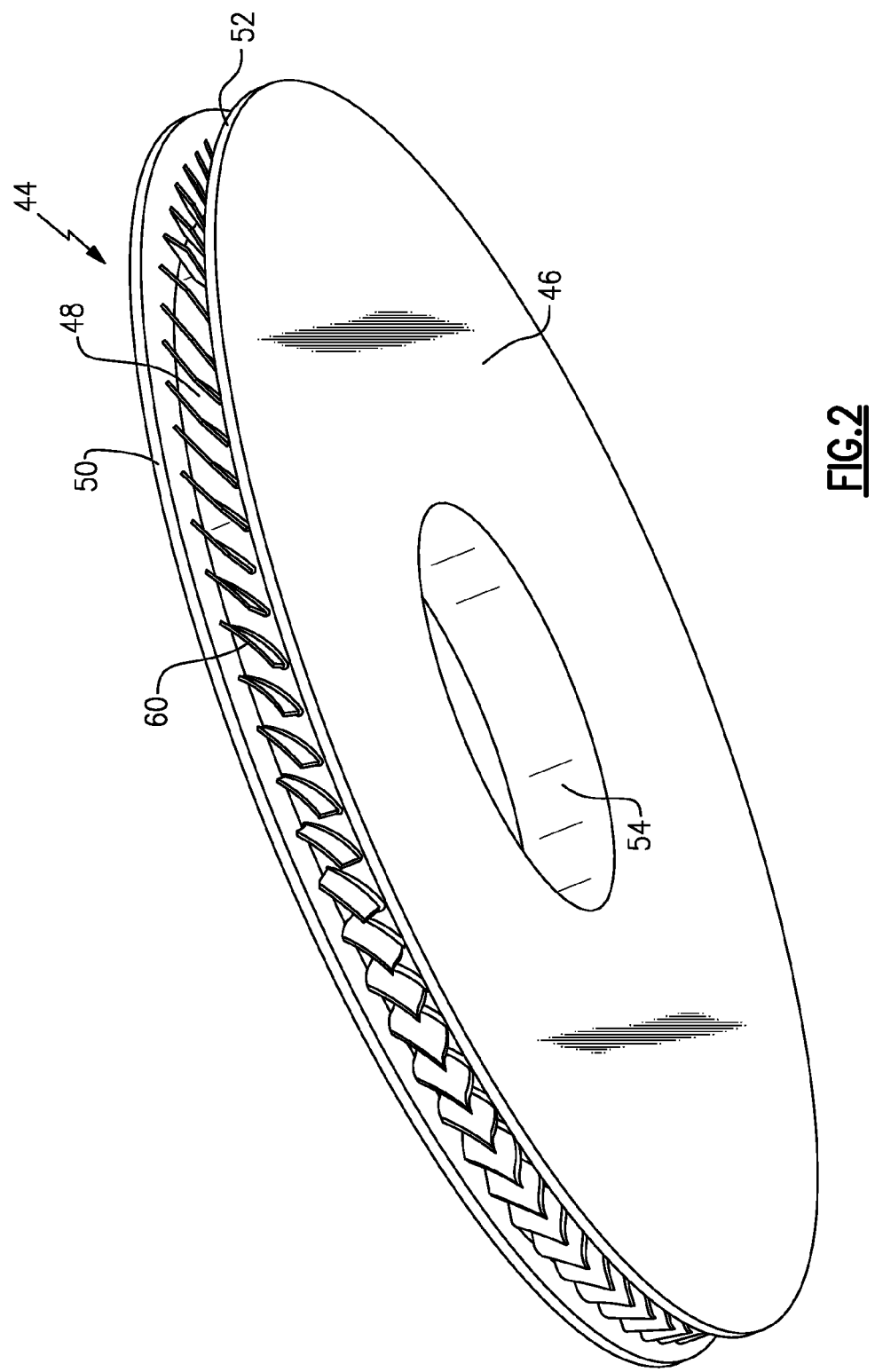
FIG. 2 illustrates a perspective view of an integrally bladed rotor.

FIG. 2 illustrates a perspective view of an integrally bladed rotor 44. The integrally bladed rotor 44 can be made of titanium, titanium alloy, nickel, nickel alloy, or any metal or metal alloy. The integrally bladed rotor 44 can be utilized in the fan section 14, the low-pressure compressor section 16, or the high-pressure compressor section 18 of the gas turbine engine 10. The integrally bladed rotor 44 includes a rotor hub 46 including an outer circumferential surface 48 defined between two circumferential flanges 50 and 52. The rotor hub 46 includes an opening 54 having a central portion 56 with a diameter A located between outer portions 58 and 59 with a diameter B, and the diameter B is greater than the diameter A (shown in FIG. 4). The integrally bladed rotor 44 also includes circumferentially spaced blades or airfoils 60 that extend from and are metallurgically joined to the outer circumferential surface 48 of the rotor hub 46.

As explained below, the outer circumferential surface 48 of the rotor hub 46 and the circumferentially spaced blades or airfoils 60 are superpolished with an abrasive media 130 to improve an aerodynamic surface finish of the integrally bladed rotor 44. The other areas of the integrally bladed rotor 44 are covered with a mask 62 (FIGS. 3 to 6) to protect these areas from the abrasive media 130, while directing the abrasive media 130 towards the outer circumferential surface 48 of the rotor hub 46 and the circumferentially spaced blades or airfoils 60.

Figure 3:
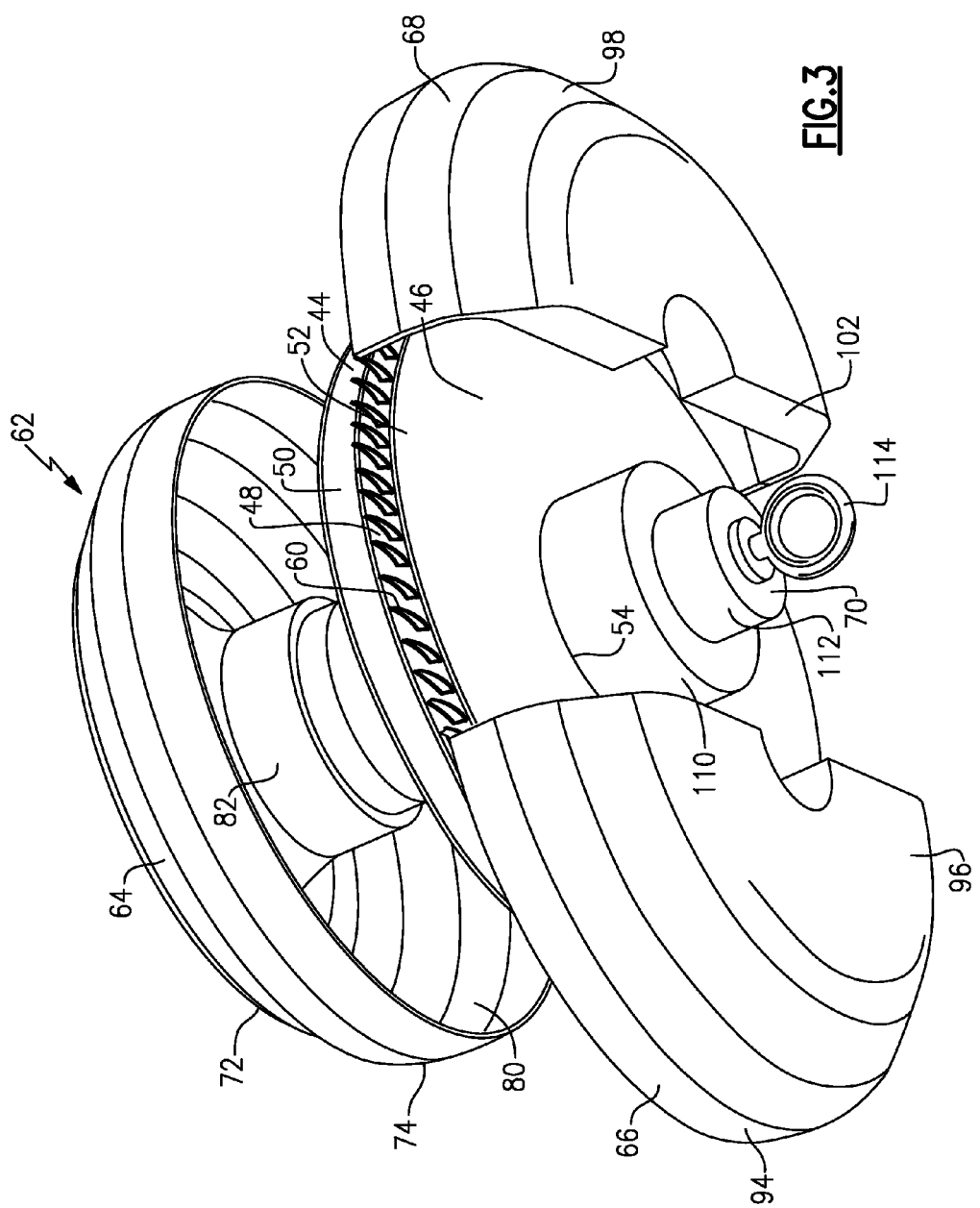
FIG. 3 illustrates a perspective exploded view of a mask and the integrally bladed rotor.

FIG. 3 illustrates an exploded view of the mask 62. The mask 62 includes four portions 64, 66, 68 and 70. In one example, the mask 62 is formed of glass reinforced nylon.

Figure 4:
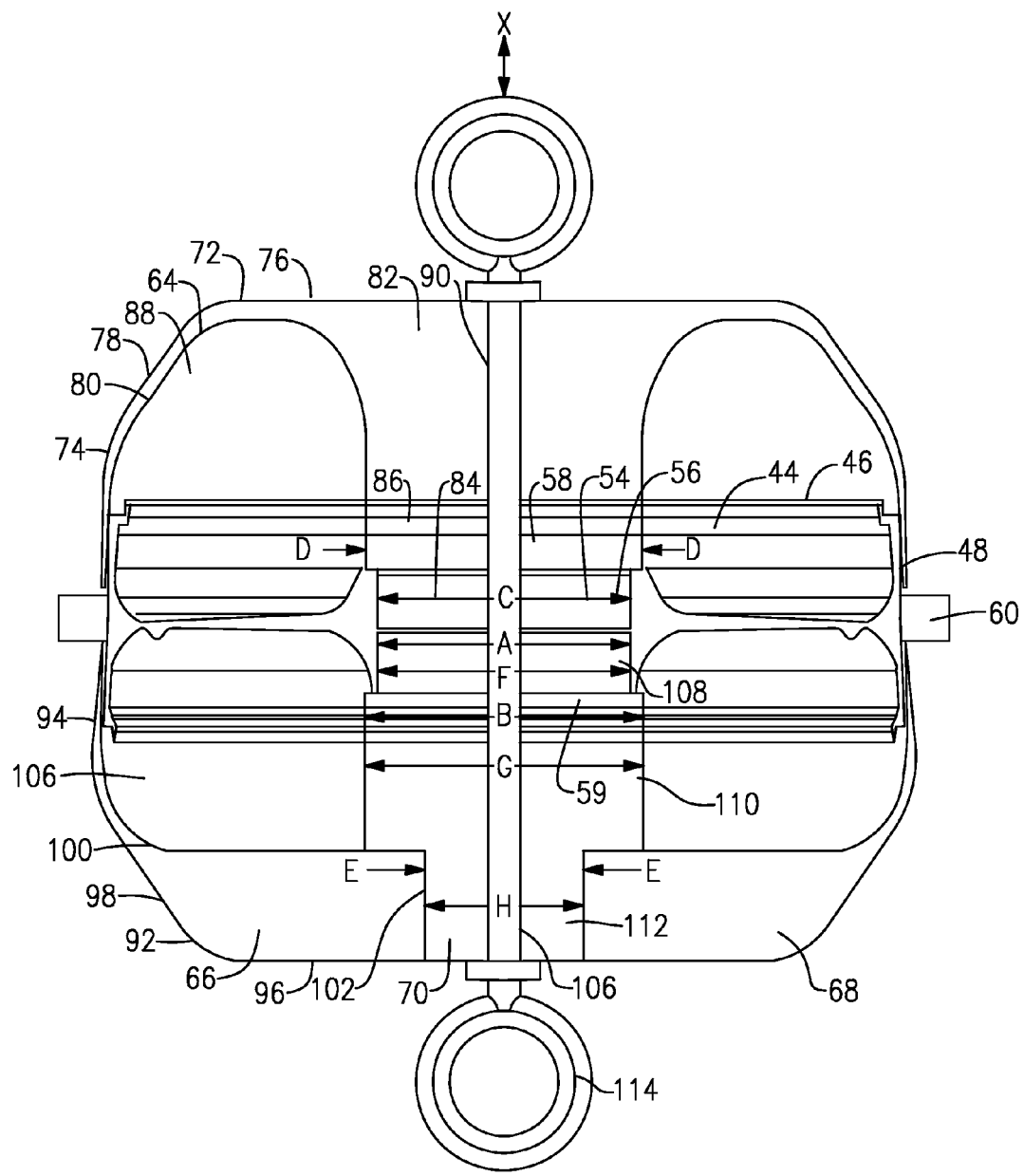
FIG. 4 illustrates a side cross-sectional view of the mask secured on the integrally bladed rotor.

As further shown in FIG. 4, the first portion 64 includes an outer surface 72 with a circumferential surface 74, a radial surface 76, and a surface located therebetween 78. In one example, the circumferential surface 74 and the radial surface 76 are substantially flat. In one example, the surface 78 is angled about 45° relative to the circumferential surface 74 and the radial surface 76. The first portion 64 also includes an inner surface 80 that generally follows a contour of the outer surface 72 and that defines a projection 82 in a center of the first portion 64. When positioned on the integrally bladed rotor 44, the projection 82 is received in the outer portion 58 and a portion of the central portion 56 of the opening 54 of the integrally bladed rotor 44.

The projection 82 has a portion 84 with a diameter C and a portion 86 with a diameter D. The diameter C is slightly less than the diameter A to allow entry of the portion 84 of the projection 82 of the first portion 64 of the mask 62 in the central portion 56 of the opening 54 of the rotor hub 46. The diameter D is slightly less than the diameter B to allow entry of the portion 86 of the projection 82 of the first portion 64 of the mask 62 in the outer portion 58 of the opening 54 of the rotor hub 46. A hollow space 88 is defined within the inner surface 80 to reduce the weight of the first portion 64. The first portion 64 also includes a central passage 90 located along a central axis X.

A second portion 66 and a third portion 68 of the mask 62 are substantially identical. The portions 66 and 68 each include an outer surface 92 with a circumferential surface 94, a radial surface 96, and a surface located therebetween 98. In one example, the circumferential surface 94 and the radial surface 96 are substantially flat. In one example, the surface 98 is angled about 45° relative to the circumferential surface 94 and the radial surface 96. The portions 66 and 68 also include an inner surface 100 that generally follows a contour of the outer surface 92. The portions 66 and 68 each include surfaces 102 that contact each other when secured to the integrally bladed rotor 44. In one example, the surfaces 102 are substantially flat. When positioned on the integrally bladed rotor 44, a passage 104 having a diameter E is defined between the portions 66 and 68. A hollow space 106 is defined within the inner surface 100 to reduce the weight of the portions 66 and 68.

A fourth portion 70 of the mask 62 is received in the outer portion 59 and a portion of the central portion 56 the opening 54 of the integrally bladed rotor 44. The fourth portion 70 includes three sections 108, 110 and 112.

The first section 108 having a diameter F is received in a portion of the central portion 56 of the opening 54 of the integrally bladed rotor 44. The diameter F is less than the diameter A to allow entry of the first section 108 of the fourth portion 70 of the mask 62 in the central portion 56 of the opening 54 of the rotor hub 46.

The second section 110 having a diameter G is received in the outer portion 59 of the opening 54. The diameter G is slightly less than the diameter B to allow entry of the second section 110 of the fourth portion 70 of the mask 62 in the outer portion 58 of the opening 54 of the rotor hub 46.

A third section 112 having a diameter H is located within the passage 104 defined by the portions 66 and 68 of the mask 62. The diameter H is less than the diameter E of the passage 104 defined between the portions 66 and 68 to allow entry of the third section 112 of the fourth portion 70 of the mask 62 in the passage 104 defined between the second portion 66 and the third portion of the rotor hub 46. The fourth portion 70 also includes a central passage 106 located along the central axis X.

As further shown in FIG. 4, the projection 82 of the first portion 64 of the mask 62 is received in the opening 54. In one example, the projection 82 is received in the outer portion 58 and a portion of the central portion 56 the opening 54. The sections 108 and 110 of the fourth portion 70 of the mask 62 are received in the opening 54 of the integrally bladed rotor 44. In one example, the sections 108 and 110 of the fourth portion 70 are received in the outer portion 59 and a portion of the central portion 56, respectively, of the opening 54. The portions 66 and 68 of the mask 62 are located outside the fourth portion 70 of the mask 62. A fastener 114 is received within the central passages 90 and 106 of the first portion 64 and the fourth portion 70, respectively, to secure the portions 64, 66, 68 and 70 together to define the mask 62. In one example, the fastener 114 is an I-bolt.

Figure 5:
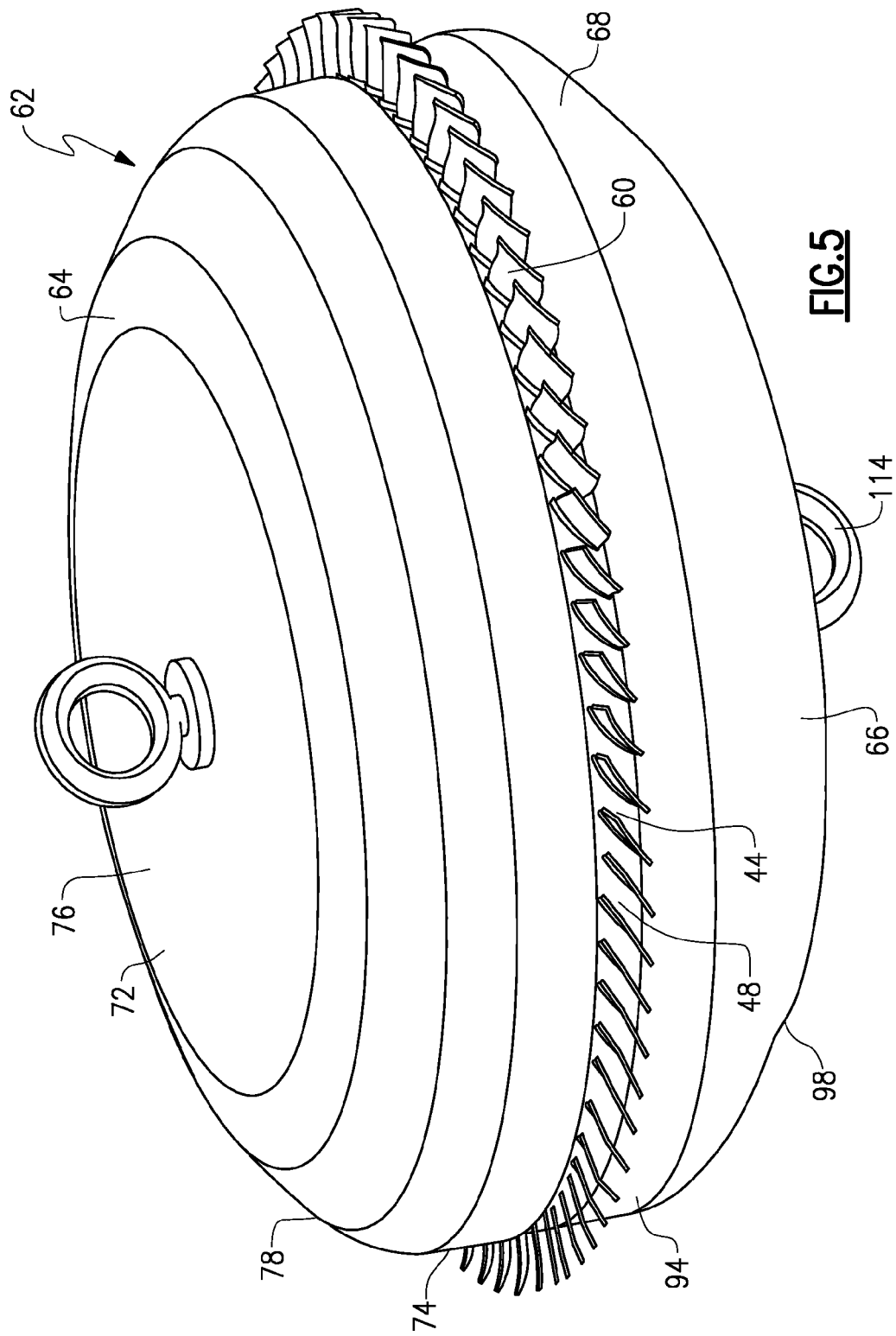
FIG. 5 illustrates a perspective view of the mask secured on the integrally bladed rotor.
Figure 6:
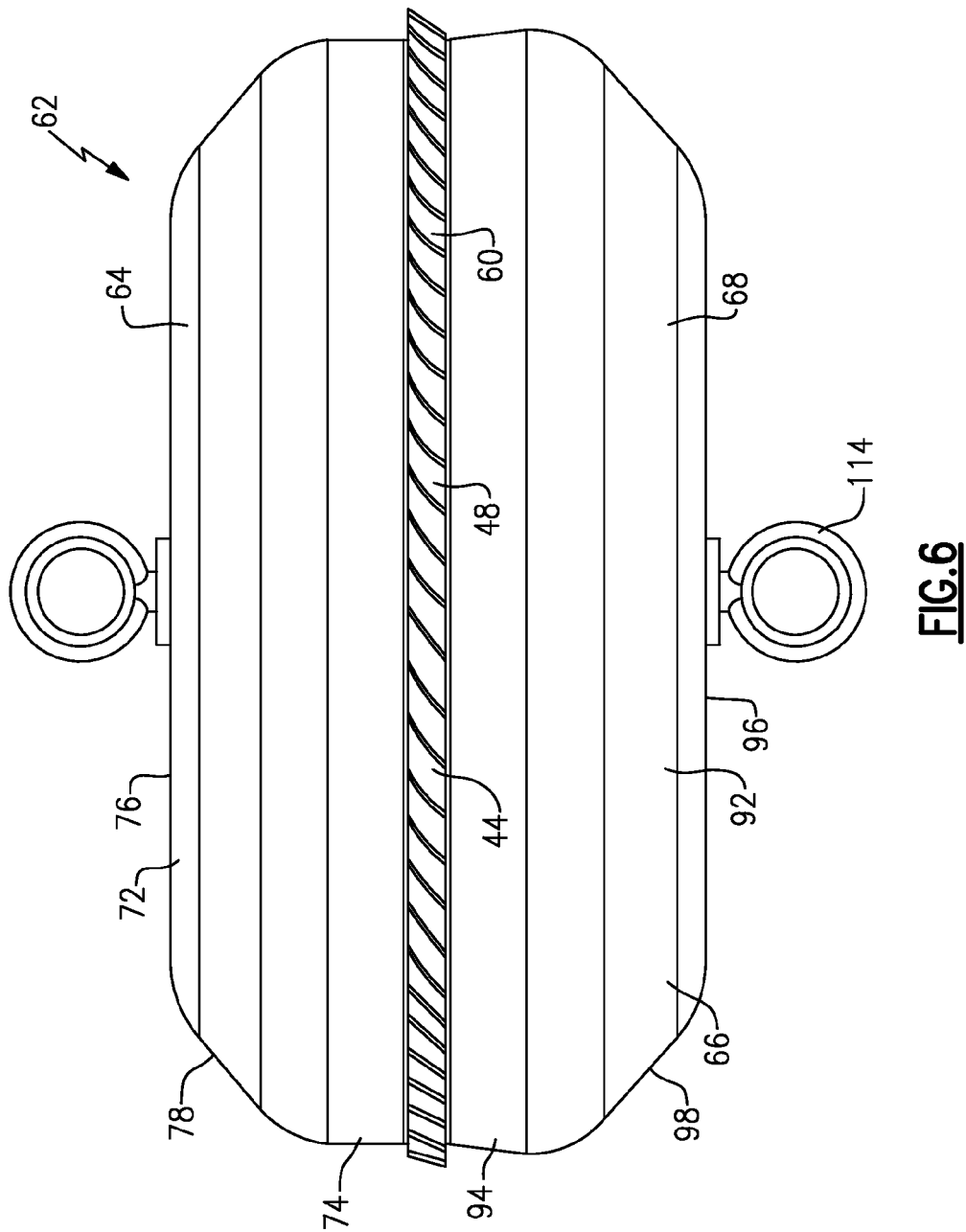
FIG. 6 illustrates another perspective view of the mask secured on the integrally bladed rotor.

As shown in FIGS. 5 and 6, once the mask 62 is positioned on the integrally bladed rotor 44, the outer circumferential surface 48 of the rotor hub 46 and the circumferentially spaced blades or airfoils 60 are exposed, but the remainder of the integrally bladed rotor 44 is covered by the mask 62. The mask 62 prevents the abrasive media 130 from contacting the other areas of the integrally bladed rotor 44 during superpolishing, maintaining the structure and dimensions of these areas.

Figure 7:
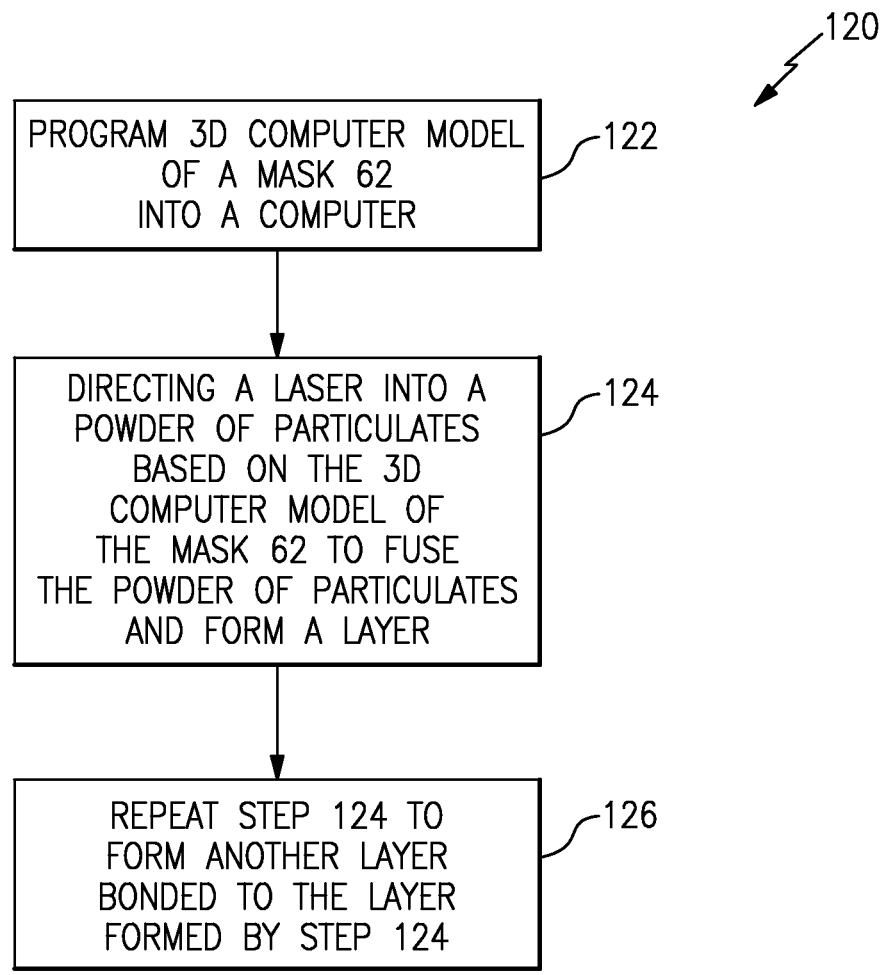
FIG. 7 illustrates a method of making the mask.

FIG. 7 illustrates a method 120 of making the mask 62 and performing the abrasive polishing process of the outer circumferential surface 48 and the circumferentially spaced blades or airfoils 60 of the integrally bladed rotor 44.

The portions 64, 66, 68 and 70 of the mask 62 are formed by an additive manufacturing process, such as a selective laser sintering process. In step 122, a three dimensional computer model of the mask 62 is programmed into a computer. In step 124, a laser is directed into a powder of particulates based on the three dimensional computer model, fusing the powder of particulates together to form a layer. In one example, the powder of particulates is glass reinforced nylon powder. In one example, the laser is pulsed. In one example, the laser is a carbon dioxide layer.

After the formation of the first layer, in step 126, a second layer is formed by the same process. The laser is directed into the powder of particulates based on the three dimensional computer model, fusing the powder of particulates together to form the second layer. The laser also bonds or sinters the first layer to the second layer. The step 126 is repeated based on the three dimensional computer model to form a plurality of layers, one layer at a time, until the mask 62 is completed. In one example, each layer has a thickness of about 0.004 inch. In one example, the portions of the mask 62 are formed from upwardly in a vertical direction.

As shown in FIG. 8, once the mask 62 is created, positioned and secured on the integrally bladed rotor 44 as described above, the mask 62 and the integrally bladed rotor 44 are positioned in a vat 128 containing an abrasive media 130 within a slurry 132. An agitator device 134 moves the abrasive media 130 within the slurry 132. A contour of the mask 62 directs the abrasive media 130 towards the outer circumferential surface 48 and the circumferentially spaced blades or airfoils 60 of the integrally bladed rotor 44 to superpolish and smooth these surfaces, improving the performance and efficiency of the integrally bladed rotor 44 and the gas turbine engine 10. The mask 62 provides a seal that prevents the abrasive media 130 from contacting the areas of the integrally bladed rotor 44 besides the outer circumferentially surface 48 and the circumferentially spaced blades or airfoils 60. Once superpolishing is complete and the mask 62 is removed, the mask 62 can be used again on another integrally bladed rotor 44.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of polishing an integrally bladed rotor, the method comprising the steps of:
    positioning a mask on an integrally bladed rotor such that a portion of the integrally bladed rotor is unmasked to define an exposed portion, wherein the step of positioning the mask includes positioning a first projection of a first portion of the mask in an opening of the integrally bladed rotor; and
    polishing the exposed portion of the integrally bladed rotor.

2. The method as recited in claim 1 including the step of creating the mask employing selective laser sintering.

3. The method as recited in claim 2 wherein the step of creating the mask includes directing a laser towards a powder of particulates based on a three dimensional computer model programmed into a computer to fuse the powder of particulates together.

4. The method as recited in claim 3 wherein the powder of particulates are glass reinforced nylon powder.

5. The method as recited in claim 3 wherein the laser is a carbon dioxide laser.

6. The method as recited in claim 3 wherein the laser is pulsed.

7. The method as recited in claim 3 wherein the step of directing the laser includes fusing the powder of particulates with the laser to form a layer having a thickness, fusing the powder of particulates with the laser to form another layer having the thickness, and fusing the layer and the another layer with the laser.

8. The method as recited in claim 7 wherein the thickness is about 0.004 inch.

9. The method as recited in claim 1 wherein the exposed portion of the integrally blade rotor is an outer circumferential surface of a rotor hub and a plurality of blades that extend from the outer circumferential surface of the rotor hub.

10. The method as recited in claim 1 wherein the step of polishing the exposed portion of the integrally bladed rotor includes positioning the mask and the integrally bladed rotor in a slurry including an abrasive media.

11. The method as recited in claim 10 including the step of agitating the slurry to move the abrasive media towards the exposed portion of the integrally bladed rotor to polish the exposed portion of the integrally bladed rotor.

12. A mask for covering and masking areas of an integrally bladed rotor, the mask comprising:
    a first portion located on a first side of an integrally bladed rotor, the first portion including a first projection that is received in a first side of an opening of the integrally bladed rotor;
    a second portion located on a second side of the integrally bladed rotor; and
    a third portion including a second projection that is received in a second side of the opening in the integrally bladed rotor.

13. The mask as recited in claim 12 wherein the first portion, the second portion, and the third portion are formed by a selective laser sintering.

14. The mask as recited in claim 12 wherein the mask is made of glass reinforced nylon.

15. The mask as recited in claim 12 wherein the first portion includes a circumferential surface, a radial surface, and a surface located therebetween.

16. The mask as recited in claim 15 wherein the circumferential surface is a substantially flat circumferential surface and the radial surface is a substantially flat radial surface.

17. The mask as recited in claim 15 wherein the surface is angled about 45° relative to the circumferential surface and the radial surface.

18. The mask as recited in claim 12 wherein the first portion is substantially hollow.

19. The mask as recited in claim 12 wherein the second portion includes a circumferential surface, a radial surface, and a surface located therebetween.

20. The mask as recited in claim 19 wherein the circumferential surface is a substantially flat circumferential surface and the radial surface is a substantially flat radial surface.

21. The mask as recited in claim 19 wherein the surface is angled about 45° relative to the circumferential surface and the radial surface.

22. The mask as recited in claim 12 wherein the second portion is substantially hollow.

23. The mask as recited in claim 12 wherein the second portion includes two identical portions that are positioned on the integrally bladed rotor to define the second portion of the mask.

24. The method as recited in claim 1 wherein the step of positioning the mask includes positioning a second projection of a second portion of the mask in the opening of the integrally bladed rotor.

25. The method as recited in claim 24 wherein the first portion of the mask is located on a first side of the integrally bladed rotor, the second portion of the mask is located on a second side of the integrally bladed rotor, and the step of positioning includes locating a third portion of the mask on the second side of the integrally bladed rotor.

26. A mask for covering and masking areas of an integrally bladed rotor, the mask comprising:
   a first portion located on a first side of an integrally bladed rotor, wherein the first portion includes a first projection that is received in an opening of the integrally bladed rotor; and
   a second portion located on a second side of the integrally bladed rotor.

27. The mask as recited in claim 24 wherein the second portion includes a second projection that is received in the opening in the integrally bladed rotor.

* * * * *